UNITED STATES PATENT OFFICE.

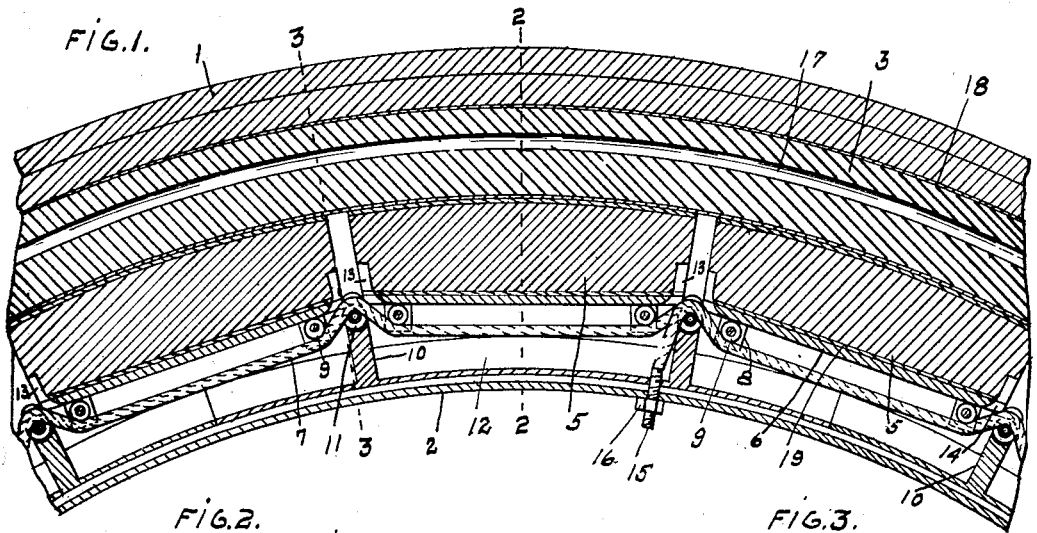
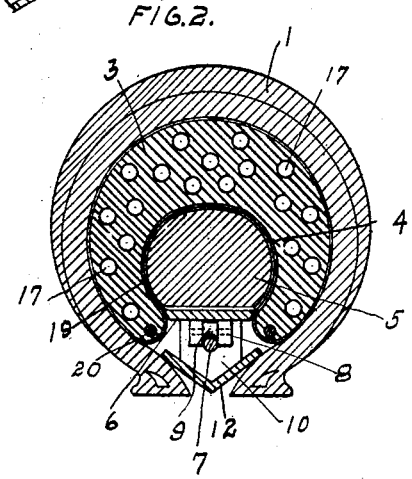
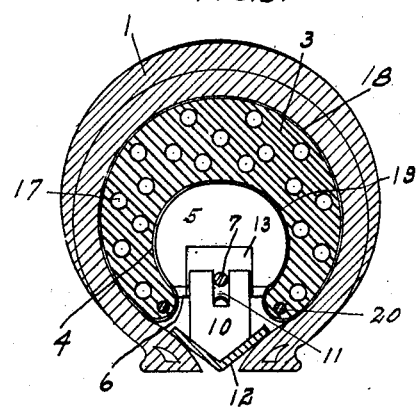
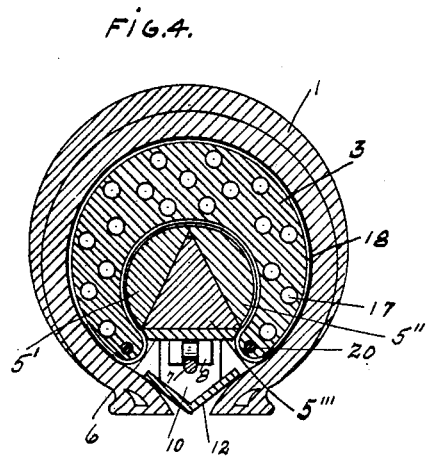
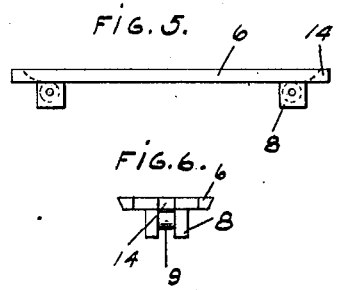
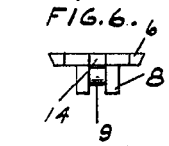
INVENTOR.
WILLIARD A. ANGLEMYER
BY Carey S. Frye
ATTORNEY.

WILLIARD A. ANGLEMYER, OF INDIANAPOLIS, INDIANA.

TIRE.

1,334,067.

Specification of Letters Patent.  Patented Mar. 16, 1920.

Application filed November 6, 1919. Serial No. 336,139.

*To all whom it may concern:*

Be it known that I, WILLIARD A. ANGLE-MYER, a citizen of the United States, residing at Indianapolis, Marion county, Indiana, have invented certain new and useful Improvements in Tires, of which the following is a specification.

This invention relates to tires and particularly to that class used in connection with automobiles, trucks and similar vehicles, and the prime feature of the invention is the provision of a resilient tire without employing air pressure as a cushioning means and at the same time obtain practically the same cushioning results as when air is used.

A further feature of the invention is in so constructing the resilient member that it may be inserted into the usual form of tire casing.

A further feature of the invention is the provision of means for expanding the resilient member for causing the resilient member to fill all parts of the tire casing, when used in connection with a casing and for properly maintaining the shape of the tire and regulating the resiliency thereof.

A further feature of the invention is the provision of flexible means for operating the expanding means whereby the expanding means will be moved inwardly or outwardly for regulating the resiliency of the tire structure.

Other objects and advantages will be hereinafter more fully set forth and pointed out in the accompanying specification.

In the accompanying drawings which are made a part of this application,

Figure 1 is a central sectional view through a section of a tire structure.

Fig. 2 is a transverse sectional view through the tire structure as seen on line 2—2, Fig. 1.

Fig. 3 is a similar view as seen on line 3—3, Fig. 1.

Fig. 4 is a transverse sectional view through the tire structure showing a different form of expanding mechanism.

Fig. 5 is a side elevation of a carriage for supporting one of the expanding blocks.

Fig. 6 is an end elevation thereof.

Referring to the drawings in which similar reference numerals designate corresponding parts throughout the several views, 1 indicates a tire casing which may be made in the usual or any preferred manner, which is mounted upon the usual form of rim 2, and in order to maintain the size and shape of the casing without the use of air for inflating purposes and at the same time provide a proper amount of resiliency for the tire, a resilient member 3 is introduced into the casing 1, said member 3 being preferably continuous around the interior of the casing.

The resilient member 3 is preferably formed of rubber and the under peripheral face thereof is provided with a cavity 4 in which are placed a plurality of expansion blocks 5, said blocks being placed end to end entirely around the interior of the member 3, the ends of the blocks being preferably spaced slightly apart. These blocks may be constructed of any suitable solid substance, but preferably of wood or similar light substance so that they will be sufficiently firm to expand the member 3 when forced outwardly thereagainst, and at the same time not materially add to the weight of the tire structure.

Each block 5 is mounted upon a carriage 6, preferably of metal and these carriages are in turn mounted upon a cable 7, of any suitable material, said carriages having depending ears 8 adjacent their ends, between which are rotatably mounted rollers 9, which rollers rest upon the cable, the ears 8 preferably projecting below the rollers so as to project on opposite sides of the cable and prevent lateral movement of the carriages on the cable.

The cable 7 is extended over the outer ends of standards 10, each standard having a sheave or roller 11 mounted in the end thereof over which the cable passes, the standards being held rigid by mounting them upon shackle plates 12 which are preferably substantially V-shaped in cross section, these plates, when the cable is operated to force the blocks 5 outwardly, bearing against the inner edges of the tire casing and thus assisting in locking the casing to the rim 2. The shackle plates 12 are preferably of such length that two of the standards 10 may be attached to each plate, said plates being curved to conform to the curvature of the tire casing and are arranged successively to form a continuous circular ring within the casing.

The blocks 5 are spaced apart substantially the distance of the thickness of the standards 10 and to prevent the ends of the blocks from contacting with the standards, the ends of the blocks are provided with recesses 13 which register with the standards, and to prevent the cable coming in contact with the ends of the carriages, the ends of the carriages are provided with notches 14.

In order to draw the cable lengthwise and thus force the blocks 5 outwardly, one end of the cable is attached to one of the standards and the opposite end thereof attached to a tensioning bolt 15, which bolt extends through one of the shackle plates 12 and through the rim 2, a nut 16 being threaded onto the bolt so that when the nut is turned onto the bolt, the cable will be drawn taut and the blocks 5 moved outwardly. In this manner the flexibility of the tire structure may be readily controlled at all times.

If desired, the resilient member may be provided with a plurality of openings 17 which lend to the resiliency thereof. Also the resilient members 3 may be covered with a fabric 18 or similar covering and likewise, the blocks 5 may be provided with a covering 19 of similar material.

The resilient member 3 may also be provided with reinforcing wires 20 in the lower portions thereof which serve to strengthen the member as well as retain its shape.

In Fig. 4 of the drawing a slightly different form of expansion block is shown and in this instance the block is formed of expanding sections 5' and 5" and a central section 5"', the latter being wedge shaped while the inner faces of the other members are tapered coincident to the taper of the faces of the central section. With this form of device, the pressure is directed sidewise as well as outwardly when the cable is operated to force the central member outwardly.

The invention claimed is:

1. In a tire structure, a resilient member having a peripheral cavity in its inner face, a plurality of expanding blocks entering and fitting said cavity, and means for simultaneously operating all of said blocks for expanding or relaxing said resilient member.

2. A tire structure including a casing, a resilient member having a circumferential cavity, a plurality of spreader blocks inclosed in said cavity, a cable structure carrying said blocks, and means for tightening or loosening said cable for expanding or releasing said blocks.

3. A tire structure including a resilient member having a circumferential cavity therein, a plurality of blocks for expanding said resilient member, said blocks being inclosed in said cavity, supporting means for each block, a flexible cable for supporting said blocks, and means for tightening said cable for expanding said resilient member by the pressure of said blocks thereagainst.

4. A tire structure including a resilient member having a circumferential cavity, a plurality of expanding blocks entering said cavity, a carriage for each block, rollers on said carriage, a cable on which said rollers rest, and means for operating said cable for moving said blocks inwardly or outwardly.

5. A tire structure including a casing, a resilient member, a plurality of expanding blocks coöperating with said resilient member, a carriage for each block, a cable for supporting said carriages, supporting posts for said cable, and shackle plates attached to said posts, said shackle plates engaging and pressing against parts of the tire structure.

6. A tire structure including a casing, a resilient member in said casing, expanding blocks coöperating with said resilient member, a supporting carriage for each block, rollers on said carriage, a cable on which said rollers rest, a plurality of stationary posts, sheaves carried by the posts for the reception of said cable, shackle plates carrying said posts the edges of which bear against the edges of said casing, and means for controlling the tension of said cable.

In testimony whereof I hereunto affix my signature.

WILLIARD A. ANGLEMYER.